3,078,190
PROCESS FOR FOAM-CLEANING METAL SURFACES

Bruno Blaser, Dusseldorf-Urdenbach, Hans Rogner, Dusseldorf-Buderich, and Georg Ziehr, Dusseldorf, Germany, assignors to Henkel & Cie. G.m.b.H., Dusseldorf-Holthausen, Germany
No Drawing. Filed Dec. 1, 1959, Ser. No. 856,352
Claims priority, application Germany Dec. 12, 1958
2 Claims. (Cl. 134—10)

The invention relates to a cleaning process for solid materials, such as metal parts, in a stream of an aqueous foam.

Cleaning and degreasing of solid materials after cutting or non-cutting fabrication or of repair and replacement parts usually is accomplished in a liquid or sometimes in a steam phase. In the latter case, additional measures commonly are required to prevent the steam from entering the work room. In liquid cleaning, as a rule detergents are used, and it becomes necessary to obviate undesirable foaming of the cleaning solutions.

It now has been found unexpectedly that a good cleaning effect is obtained by treating the materials to be cleaned in a stream of an aqueous foam phase of a cleaning solution.

To form such a foam phase, neutral, acid or alkaline aqueous solutions can be employed which contains either soaps or known anionic or cationic detergents or mixtures thereof. Anionic or anion-active detergents which can be used for the purpose are, e.g., alkyl sulfonates, alkyl benzene sulfonates, fatty alcohol sulfonates and similar compounds. Suitable non-ionic detergents are particularly reaction products of fatty acids, amides or alcohols with ethylene oxide or propylene oxide. Cathionic or cation-active substances also are suited for the formation of the aqueous foam phase. The temperature of the cleaning solution from which the foam phase is formed can range from approximately 20 to approximately 100° C.

Surprisingly, it has been found that degreasing of materials after non-cutting fabrication in the foam phase can be accomplished even at room temperature in a much shorter period of time than is required for the same cleaning solution but in liquid phase.

In order to further improve the cleaning solutions forming the base for the foam phase, known alkaline or acidic substances can be added thereto. Among these additives, the following have been found especially advantageous: sodium metasilicate, waterglass, soda, sodium hydroxide, orthophosphates and anhydrous phosphates, e.g., tetrasodium phosphate, bisodium pyrophosphate, sodium hexametaphosphate, sodiumtripolyphosphate.

To carry out the process according to the invention, finely divided air is blown into the aqueous cleaning solution, or the foam is produced by other mechanical means, e.g., by rapidly rotating impeller blades. The materials to be treated are hung into the stream of the foam without immersion in the solution. The foam produced flows around the materials to be cleaned, overflows the container and is reconducted into the cleaning solution or else is collected in a second container where it condenses. Condensation of the foam into the liquid phase occurs, depending on its stability, either during the flowback or in the container into which it is conducted. Very stable foams can be broken by known means, e.g., by conducting them over heated surfaces. This can also be applied to less stable foams when a fast beraking of the foam is required for reasons of proper utilization of the equipment at hand. The condensate thus obtained can be re-used entirely or partially for the formation of a new foam phase. However, depending upon the length of use and the degree of soilage of the foam, it is opportune to remove the collected oil and to filter the condensate before employing it again for producing foam. It has been found that the process according to the invention also efficiently removes impurities in dust form, such as polishing and grinding dust and others, in the manner as described.

The invention now will be further explained by means of the following example. However, it should be understood that this is given merely by way of illustration, not of limitation, and that numerous changes may be made in the details without departing from the spirit and the scope of the invention as hereinafter claimed.

Example

A solution is prepared consisting of 0.25 percent alkyl benzene polyglycol ether (oil-soluble), 0.75 percent alkyl benzene polyglycol ether (water-soluble), 2.0 percent sodium metasilicate and 97.0 percent water. This solution is used as a bath in a container which is filled to approximately one-fourth of its capacity therewith. Above the surface of the solution the materials to be cleaned are hung in the container. The latter is provided with a frit on its bottom through which finely-divided air is blown into the solution. The stream of the foam phase is thus produced. It flows around the pieces to be cleaned and removes oily and dusty impurities present. The foam flows over the upper edge of the container and breaks while flowing downward. After removal of the oil, the condensate is pumped back into the cleaning bath.

Soiled metal sheets cleaned in the stream of the foam phase as described are cleaned within a very much shorter time than by immersing them in the solution. The degreasing time in the foam phase was shortened even more, i.e., a further one-third of the time expended, upon incorporation of 2 percent sodium orthophosphate. When to this 2 percent sodium hydroxide are added, the entire cleaning time in the foam phase amounts to one-third of the time in aqueous phase.

The degreasing and cleaning times in the foam phase are as dependent upon the flow speed of the foam as they are in aqueous (liquid) phase upon the movement of the liquid in the circulating process.

We claim as our invention:

1. A process for cleaning and degreasing metal surfaces in a stream of a foam phase, which comprises suspending said surfaces above a cleaning solution having a temperature of 20–100° C., but out of direct contact with said solution; said solution consisting of an aqueous solution of detergents; converting at least part of said solution into a foam by blowing finely-divided air through said solution from the bottom, thus forming a stream of a foam phase, the foam rising and flowing around said surfaces, further rising and overflowing said container, flowing downward outside said container and breaking into a liquid condensate; the condensate being freed from oil and impurities and re-used for the formation of a new foam phase.

2. A process for cleaning and degreasing metal surfaces in a stream of a foam phase, which comprises suspending said surfaces above a cleaning solution having a temperature of 20–100° C., but out of direct contact with said solution; said solution consisting of an aqueous solution of detergents and containing additives selected from the group consisting of sodium metasilicate, waterglass, soda, sodium hydroxide, tetrasodium phosphate, bisodium phosphate, sodium hexametaphosphate, and sodium tripolyphosphate; converting at least part of said solution into a foam by blowing finely-divided air through said solution from the bottom; thus forming a stream of a foam phase, the foam rising and flowing around said surfaces, further rising and overflowing said container, flowing downward outside said container and breaking into a liquid condensate; the condensate being freed from oil and impurities and re-used for the formation of a new foam-phase.

References Cited in the file of this patent

UNITED STATES PATENTS

| | | |
|---|---|---|
| 1,948,568 | Farber et al. | Feb. 27, 1934 |
| 2,023,496 | Todd | Dec. 10, 1935 |
| 2,042,347 | Mackenzie | May 26, 1936 |
| 2,301,601 | Wittwer et al. | Nov. 10, 1942 |
| 2,325,957 | Krogel | Aug. 3, 1943 |
| 2,485,968 | Hilliker | Oct. 25, 1949 |
| 2,634,222 | Quimby | Apr. 7, 1953 |
| 2,788,009 | Lones | Apr. 9, 1957 |
| 2,873,600 | Demaret | Feb. 17, 1959 |